(12) United States Patent
Kereth et al.

(10) Patent No.: US 11,184,315 B2
(45) Date of Patent: Nov. 23, 2021

(54) SYSTEMS AND METHODS FOR PROVIDING DATA ANALYTICS FOR VIDEOS BASED ON A TIERED ARCHITECTURE

(71) Applicant: Facebook, Inc., Menlo Park, CA (US)

(72) Inventors: Lior Ben Kereth, San Francisco, CA (US); Anaid Gomez Ortigoza Petit Jean, Belmont, CA (US); Rujin Cao, Newark, CA (US); Christine Farahat Sedky Abouelkhel Awad, Newark, CA (US); Mathumathi Velusamy, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/432,135

(22) Filed: Jun. 5, 2019

(65) Prior Publication Data

US 2019/0288977 A1    Sep. 19, 2019

Related U.S. Application Data

(63) Continuation of application No. 15/076,534, filed on Mar. 21, 2016, now Pat. No. 10,341,283.

(51) Int. Cl.
*G06F 15/16* (2006.01)
*H04L 12/58* (2006.01)

(52) U.S. Cl.
CPC .............. *H04L 51/32* (2013.01); *H04L 51/10* (2013.01); *H04L 51/08* (2013.01)

(58) Field of Classification Search
CPC .......... H04L 51/08; H04L 51/10; H04L 51/32
See application file for complete search history.

(56) References Cited

U.S. PATENT DOCUMENTS

| 8,655,878 B1 | 2/2014 | Kulkarni et al. |
| 8,886,723 B1 | 11/2014 | Gargi et al. |

(Continued)

FOREIGN PATENT DOCUMENTS

| CN | 104285237 A | 1/2015 |
| CN | 104508653 A | 4/2015 |

(Continued)

OTHER PUBLICATIONS

Google, "YouTube Content ID Handbook 2.0", dated Q2-2014, 111 pages—Applicant-supplied reference, therefore not provided. (Year: 2014).*

(Continued)

*Primary Examiner* — Richard G Keehn
(74) *Attorney, Agent, or Firm* — Sheppard Mullin Richter & Hampton LLP

(57) ABSTRACT

Systems, methods, and non-transitory computer-readable media can acquire a video resource at a first level of a tiered architecture. A first video representation can be generated, based on the video resource, at a second level of the tiered architecture. The first video representation can be associated with a first publisher. It can be detected that at least a first post and a second post are utilizing the first video representation. The first post and the second post can be representable at a third level of the tiered architecture and can be initiated by the first publisher. Data analytics for the first video representation can be aggregated based on the first post and the second post.

20 Claims, 9 Drawing Sheets

(56) References Cited

U.S. PATENT DOCUMENTS

| | | | |
|---|---|---|---|
| 9,135,674 | B1 | 9/2015 | Yagnik et al. |
| 9,497,276 | B2 | 11/2016 | Klau |
| 2006/0087941 | A1* | 4/2006 | Obradovich ......... G11B 27/034 369/47.12 |
| 2010/0158391 | A1 | 6/2010 | Cunningham et al. |
| 2012/0117475 | A1* | 5/2012 | Lee ..................... H04L 51/32 715/733 |
| 2012/0227089 | A1 | 9/2012 | Lee et al. |
| 2012/0323944 | A1* | 12/2012 | Robbin ................ G06F 16/178 707/758 |
| 2013/0110978 | A1* | 5/2013 | Gordon ................ G06Q 30/02 709/218 |
| 2014/0025755 | A1* | 1/2014 | Hughes ................ G06Q 10/10 709/206 |
| 2014/0046970 | A1* | 2/2014 | Patel .................. G06Q 30/0276 707/769 |
| 2014/0282709 | A1* | 9/2014 | Hardy ............. H04N 21/44222 725/34 |
| 2014/0380354 | A1 | 12/2014 | Relyea et al. |
| 2015/0082366 | A1* | 3/2015 | French ............. H04N 21/6371 725/116 |
| 2015/0319138 | A1* | 11/2015 | Yan ..................... H04L 63/145 726/11 |
| 2016/0034712 | A1 | 2/2016 | Patton et al. |
| 2016/0057199 | A1* | 2/2016 | Aziz ..................... H04L 51/32 709/204 |
| 2016/0117489 | A1* | 4/2016 | Furuichi ............... G06F 21/105 726/1 |

FOREIGN PATENT DOCUMENTS

| | | |
|---|---|---|
| JP | 2008186330 | 8/2008 |
| JP | 2016504780 | 2/2016 |
| KR | 20080083079 | 9/2008 |

OTHER PUBLICATIONS

International Application No. PCT/US2016/023643, International Search Report and Written Opinion dated Nov. 25, 2016, 14 pages.
Trowbridge, David, "Enterprise Solution Patterns Using Microsoft. NET: Deployment Patterns," Jun. 2003 [retrieved online at https://msdn.microsoft.com/en-us/library/ff646997(d=printer).aspx on Jul. 28, 2017], 4 pages.
European Patent Application No. 16189951.3, Search Report dated Jan. 30, 2017, 9 pages.
European Patent Application No. 16189951.3, Search Report dated Nov. 4, 2019, 4 pages.
Japanese Patent Application No. 2018-549955, Search Report dated Mar. 10, 2020, 3 pages.
Anonymous, "Understand Youtube Rights Management—YouTube Help", Sep. 8, 2015, retrieved from hhttps://web.archive.org/web/20150908005514/https://support.google.com/youtube/answer/4597810?hl=en on Mar. 15, 2019 (3 pages).
Anonymous, "Youtube Content ID Handbook 2.0", Jan. 1, 2014, retireved from https://web.archive.org/web/20151107205341/https://storage.googleapis.com/support-kms-prod/C830DAA262E2AC953C4900DA2F855EAA3312 on Mar. 15, 2019, pp. 1-111.
Adkiharki et al, "Reverse Engineering the YouTube Delivery Cloud", IEEE International Conference on Multimedia and Expo, Jan. 1, 2011, retrieved from https://projet.lliris.cnrs.fr/imagine/pub/proceedings/ICME2011/HTML/Papers/Workshops/paper_97.pdf, 6 pages.
First Office Action dated Aug. 25, 2021 for Chinese Patent Application No. 201680085910.1, filed Mar. 22, 2016, 16 pages.

\* cited by examiner

500

```
┌─────────────────────────────────────────────────────────────────────┐
│ Detect that a third post is utilizing a second video representation │
│                   generated based on the video resource             │
│                                  502                                │
└─────────────────────────────────────────────────────────────────────┘
                                   │
                                   ▼
┌─────────────────────────────────────────────────────────────────────┐
│ Cause the third post to utilize the first video representation      │
│                  instead of the second video representation         │
│                                  504                                │
└─────────────────────────────────────────────────────────────────────┘
                                   │
                                   ▼
┌─────────────────────────────────────────────────────────────────────┐
│ Aggregate data analytics for the first video representation further │
│                        based on the third post                      │
│                                  506                                │
└─────────────────────────────────────────────────────────────────────┘
```

FIGURE 5

SYSTEMS AND METHODS FOR PROVIDING DATA ANALYTICS FOR VIDEOS BASED ON A TIERED ARCHITECTURE

CROSS-REFERENCE TO RELATED APPLICATIONS

This application is a continuation of U.S. patent application Ser. No. 15/076,534, filed on Mar. 21, 2016 and entitled "SYSTEMS AND METHODS FOR PROVIDING DATA ANALYTICS FOR VIDEOS BASED ON A TIERED ARCHITECTURE", which is incorporated herein by reference in its entirety.

FIELD OF THE INVENTION

The present technology relates to the field of multimedia processing. More particularly, the present technology relates to techniques for providing data analytics for videos based on a tiered architecture.

BACKGROUND

Today, people often utilize computing devices (or systems) for a wide variety of purposes. Users can use their computing devices to, for example, interact with one another, access content, share content, and create content. In some cases, users can utilize their computing devices to generate, download, view, access, or otherwise interact with multimedia or media content, such as images, videos, audio, and text. For example, users of a social networking system (or service) can load, stream, access, and/or share video content items by utilizing their computing devices.

In some instances, users can access, view, upload, and/or share various video content items (i.e., videos), such as via a media sharing online resource. For example, the media sharing online resource can be included with the social networking system. However, conventional approaches specifically arising in the realm of computer technology can treat each posted video as an attachment to a post within the social networking system. As such, when the same video is posted (or reposted) on multiple occasions, uploading and storing the video can require significant resources. Moreover, under conventional approaches, when a particular video from an original publisher (i.e., original user) is shared by another publisher (i.e., sharing user), the original user may not be sufficiently or properly credited with originally providing the video and/or the sharing user may not be sufficiently or properly credited with sharing the video. Accordingly, conventional approaches can create challenges for or reduce the overall experience associated with utilizing, accessing, or interacting with media content such as videos.

SUMMARY

Various embodiments of the present disclosure can include systems, methods, and non-transitory computer readable media configured to acquire a video resource at a first level of a tiered architecture. A first video representation can be generated, based on the video resource, at a second level of the tiered architecture. The first video representation can be associated with a first publisher. It can be detected that at least a first post and a second post are utilizing the first video representation. The first post and the second post can be representable at a third level of the tiered architecture and can be initiated by the first publisher. Data analytics for the first video representation can be aggregated based on the first post and the second post.

In an embodiment, it can be detected that a third post is utilizing a second video representation generated based on the video resource. The third post can be initiated by a second publisher. The third post can be caused to utilize the first video representation instead of the second video representation. Data analytics for the first video representation can be aggregated further based on the third post.

In an embodiment, detecting that the third post is utilizing the second video representation can be based on one or more image hashing processes.

In an embodiment, the second publisher can be provided with access to the data analytics for the first video representation.

In an embodiment, a notification indicating that the third post is being initiated by the second publisher can be provided to the first publisher. Causing the third post to utilize the first video representation instead of the second video representation can be based on a command from the first publisher.

In an embodiment, providing the notification can be associated with a copyright checking process.

In an embodiment, the data analytics can be associated with at least one of reach information, view count information, viewer information, social engagement information, view time information, or completion information.

In an embodiment, the view count information can include at least a first view count associated with the first post and a second view count associated with the second post. Aggregating the data analytics for the first video representation can include aggregating the first view count and the second view count.

In an embodiment, the view count information can further include first attribution information for the first view count associated with the first post and second attribution information for the second view count associated with the second post.

In an embodiment, the video resource can be associated with at least one of an image classification, an image hash value, a description, a caption, an author, a time, a date, a preview image, an encoding, a clip, a tag, or a label.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method associated with providing data analytics for videos based on a tiered architecture, according to an embodiment of the present disclosure.

Figure 1:
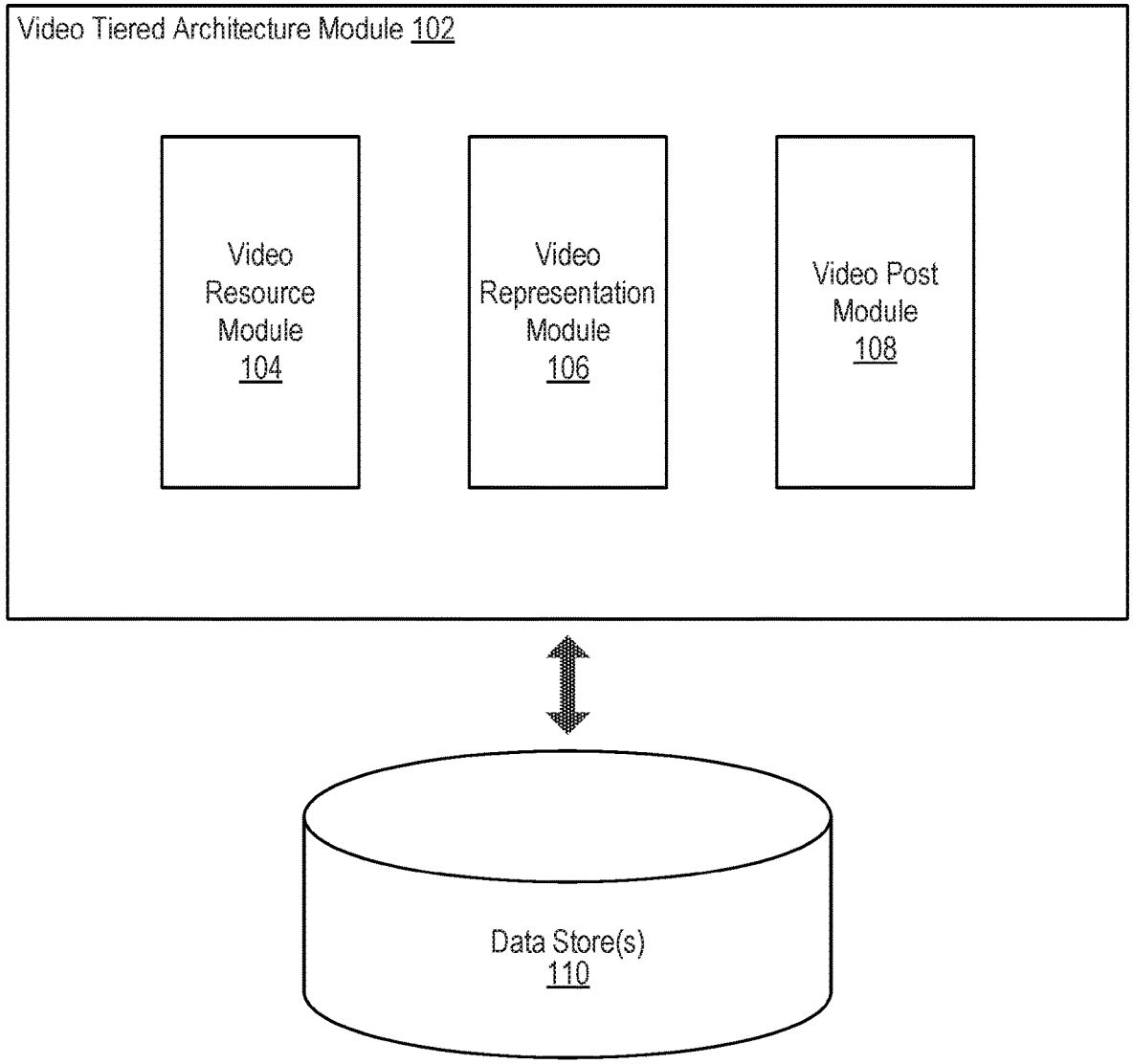
FIG. 1 illustrates an example system including an example video tiered architecture module configured to facilitate providing data analytics for videos based on a tiered architecture, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein. It should be understood that all examples herein are provided for illustrative purposes and that there can be many variations or other possibilities associated with the disclosed technology.

DETAILED DESCRIPTION

Providing Data Analytics for Videos Based on a Tiered Architecture

People use computing systems (or devices) for various purposes. Users can utilize their computing systems to establish connections, engage in communications, interact with one another, and/or interact with various types of content. In some cases, computing devices can include or correspond to cameras capable of capturing or recording media content, such as images or videos (including sets of video image frames or still frames). In some instances, computing devices can be utilized by users to view, edit, upload, post, and/or share media content items such as videos. For example, users can access a media sharing online resource via their computing devices in order to watch, provide, share, and/or otherwise interact with video content. In this example, the media sharing online resource can be provided by or included with a social networking system (or service).

In many cases, conventional approaches specifically arising in the realm of computer technology for processing videos can consider or treat each video posted within the social networking system to be an attachment to a respective post. Such conventional approaches can require different posts, of the same video, from different publishers (i.e., users) to have separate video uploading processes as well as separate video storing processes. This can, in many instances, be an inefficient use of resources. Moreover, in some cases, treating the same video as different attachments to different posts can cause data analytics for the same video to be undesirably spread across the different posts and/or across different publisher accounts. Furthermore, in accordance with conventional approaches, when a particular video from an original publisher is shared by another publisher, the original publisher may not be sufficiently or properly credited with or otherwise recognized as originally providing the video and/or the sharing publisher may not be sufficiently or properly credited with sharing the video. For example, in some instances, the sharing publisher may have collaborated with the original publisher and/or otherwise be involved with the video. Conventional approaches often fail to provide appropriate recognition to such publishers. Accordingly, conventional approaches can create challenges for or reduce the overall experience associated with utilizing, accessing, or interacting with media content such as videos.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can provide data analytics for videos based on a tiered architecture. Various embodiments of the disclosed technology can acquire a video resource at a first level of a tiered architecture. A first video representation can be generated, based on the video resource, at a second level of the tiered architecture. The first video representation can be associated with a first publisher. It can be detected that at least a first post and a second post are utilizing the first video representation. The first post and the second post can be representable at a third level of the tiered architecture and can be initiated by the first publisher. Data analytics for the first video representation can be aggregated based on the first post and the second post. It is contemplated that there can be many variations and/or other possibilities associated with the disclosed technology.

FIG. 1 illustrates an example system 100 including an example video tiered architecture module 102 configured to facilitate providing data analytics for videos based on a tiered architecture, according to an embodiment of the present disclosure. As shown in the example of FIG. 1, the video tiered architecture module 102 can include a video resource module 104, a video representation module 106, and a video post module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the video tiered architecture module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video tiered architecture module 102 can be implemented, in part or in whole, as software running on one or more computing devices or systems, such as on a user or client computing device. For example, the video tiered architecture module 102 or at least a portion thereof can be implemented as or within an application (e.g., app), a program, an applet, or an operating system, etc., running on a user computing device or a client computing system, such as the user device 610 of FIG. 6. In another example, the video tiered architecture module 102 or at least a portion thereof can be implemented using one or more computing devices or systems which can include one or more servers, such as network servers or cloud servers. In some instances, the video tiered architecture module 102 can, in part or in whole, be implemented within or configured to operate in conjunction with a social networking system (or service), such as the social networking system 630 of FIG. 6. It should be appreciated that there can be many variations or other possibilities.

The video tiered architecture module 102 can be configured to provide a tiered architecture, which can be utilized to acquire, manage, store, and/or otherwise process videos. In some embodiments, the tiered architecture can include at least three levels, such as a base level, one or more middle levels, and a top level. In some implementations, the video tiered architecture module 102 can utilize the video resource module 104 to facilitate acquiring a video resource at a first level of the tiered architecture, such as at the base level. The base level can, for instance, hold a plurality of video resources. In one example, a user such as a publisher or provider of a video can upload or otherwise provide the video. In this example, the video resource module 104 can be configured to get, fetch, pull, retrieve, receive, and/or otherwise acquire data representing the video. The data (e.g., a video file) representing the video can then be acquired as a video resource. In this example, the video resource can comprise the data or the file that corresponds to the video.

Moreover, in some embodiments, the video resource module 104 can calculate, determine, recognize, receive, and/or otherwise acquire, for the video resource, at least one of an image classification, an image hash value, a description, a caption, an author, a time, a date, a preview image, an encoding, a clip, a tag, a label, and/or other metadata, etc. For instance, the description, the caption, video clip/segment/portion information, the tag, and/or the label, etc., can be acquired by the video resource module 104 from the user or publisher. The video resource module 104 can utilize an image classification process to obtain the image classification for the video resource and/or an image hashing algorithm to obtain the image hash value for the video resource. The video resource module 104 can also calculate or retrieve author information (e.g., user/publisher information) and/or date/time information (e.g., timestamp). The video resource module 104 can further generate one or more preview images (e.g., thumbnails) and/or one or more encodings (e.g., standard definition version, high definition version, 480 pixels at 60 frames per second, 720 pixels at 60 frames per second, 720 pixels at 30 frames per second, 1080 pixels at 30 frames per second, etc.) for the video resource. The video resource module 104 can then associate the at least one of the image classification, the image hash value, the description, the caption, the author, the time, the date, the preview image, the encoding, the clip, the tag, the label, and/or the other metadata, etc., with the video resource. Subsequently, such information, properties, and/or metadata associated with the video resource can be reused (instead of being re-calculated, reproduced, reacquired, and/or copied, etc.) when the video resource is used again. It should be appreciated that all examples herein are provided for illustrative purposes and that many variations associated with the disclosed technology are possible.

In addition, the video representation module 106 can be configured to facilitate generating, based on the video resource, a first video representation (or asset, abstraction, etc.) at a second level of the tiered architecture. The first video representation can be associated with a first publisher.

The video representation module 106 can be also configured to facilitate detecting that at least a first post and a second post are utilizing the first video representation. The first post and the second post can be initiated and/or made by the first publisher. The video representation module 106 can be further configured to facilitate aggregating, based on the first post and the second post, data analytics for the first video representation. More details regarding the video representation module 106 will be provided below with reference to FIG. 2.

Moreover, the video post module 108 can be configured to facilitate enabling the first post and the second post to be representable at a third level of the tiered architecture. In some embodiments, the video post module 108 can also be compatible or operable with the video representation module 106. In one example, the video post module 108 can work in conjunction with the video representation module 106 to detect that at least the first post and the second post are utilizing the first video representation. In another example, the video post module 108 can acquire data analytics, metrics, and/or other information from the first post and the second post, such that the video representation module 106 can aggregate the data analytics for the first video representation. As discussed above, it is contemplated that all examples herein are provided for illustrative purposes and that there can be many variations or other possibilities associated with the disclosed technology.

Furthermore, in some embodiments, the video post module 108 can operate in conjunction with the video representation module 106 to detect that a third post is utilizing a second video representation generated based on the video resource. The third post can, for example, be initiated or made by a second publisher. The video post module 108 can also enable the third post to be representable in the third level of the tiered architecture. In some cases, the video post module 108 and/or the video representation module 106 can cause the third post to utilize the first video representation instead of the second video representation. Subsequently, the video representation module 106 can facilitate aggregating data analytics for the first video representation further based on the third post. In some implementations, detecting that the third post is utilizing the second video representation can be based on one or more image hashing processes (e.g., MD5 hashes). Again, many variations are possible.

Additionally, in some embodiments, the video tiered architecture module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the video tiered architecture module 102. Again, it is contemplated that there can be many variations or other possibilities associated with the disclosed technology.

Figure 2:
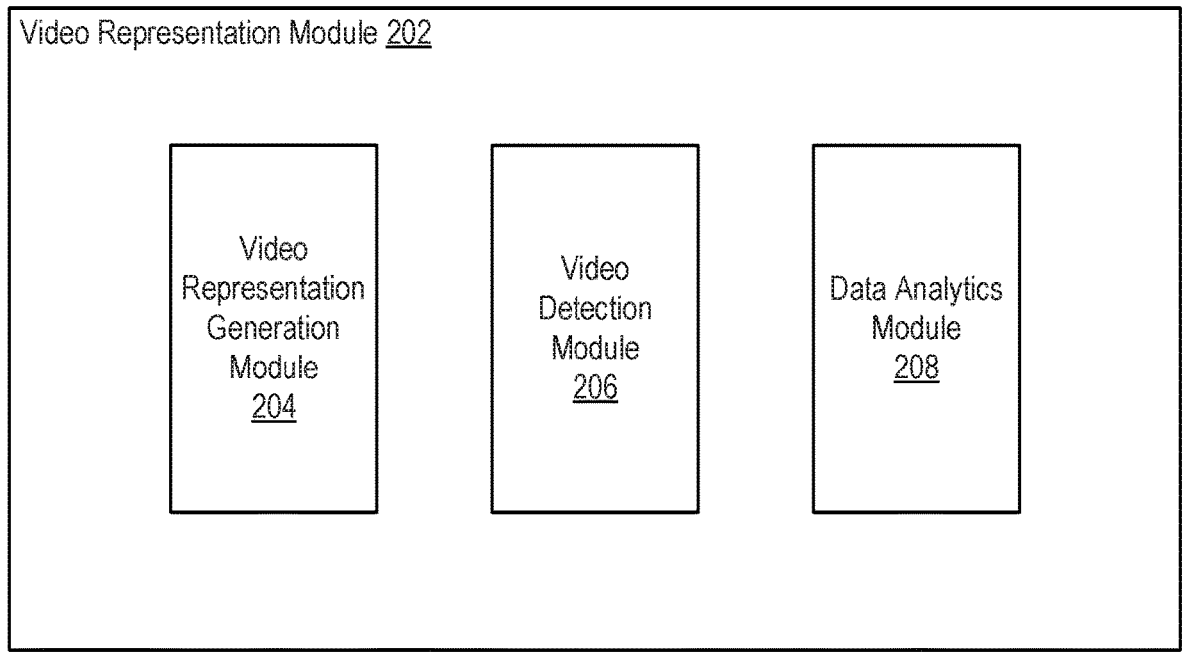
FIG. 2 illustrates an example video representation module configured to facilitate providing data analytics for videos based on a tiered architecture, according to an embodiment of the present disclosure.

FIG. 2 illustrates an example video representation module 202 configured to facilitate providing data analytics for videos based on a tiered architecture, according to an embodiment of the present disclosure. In some embodiments, the video representation module 106 of FIG. 1 can be implemented as the example video representation module 202. As shown in FIG. 2, the video representation module 202 can include a video representation generation module 204, a video detection module 206, and a data analytics module 208.

As discussed previously, the video representation module 202 can be configured to facilitate generating, based on a video resource at a first level of a tiered architecture, a first video representation at a second level of the tiered architecture. The first video representation can be associated with a first publisher. In general, the second level in the tiered architecture can provide a layer in which video representations are situated. One or more video representations associated with a video resource can enable data analytics, insights, information, and/or other metrics, etc., to be acquired (and aggregated). In some embodiments, the first publisher can provide or upload a video. The video can be stored as a video resource at the first level. When the first publisher attempts to initiate, create, and/or publish a post including the video, the video representation module 202 can utilize the video representation generation module 204 to generate, develop, produce, and/or create, etc., a first video representation (i.e., a first video asset, a first video abstraction, etc.) that represents an instance of the video. In some cases, there can be one video representation (or asset, abstraction, etc.) per publisher per video. In some instances, there can be more than one video representation of a particular video for a particular user/publisher. Many variations are possible.

Moreover, the video representation module 202 can be configured to facilitate detecting that at least a first post and a second post are utilizing the first video representation, as discussed. The first post and the second post can, for example, be initiated by the first publisher and be representable at a third level of the tiered architecture. In some implementations, the video representation module 202 can utilize the video detection module 206 to facilitate detecting that at least the first post and the second post are utilizing the first video representation.

In one example, a particular user can upload a video that becomes stored as a particular video resource at a first level of the tiered architecture. The particular user can also initiate and/or make an initial post involving the video, which can cause the video representation generation module 204 to generate, based on the particular video resource, a first video representation for the video included in this initial post. Data analytics can be tracked and/or maintained for this initial post involving the video. The particular user can then decide to make an subsequent post also involving the video. Instead of uploading and storing the same video twice, the video representation generation module 204 can generate a second video representation for the same video and link this second video representation to (or base this second video representation on) the particular video resource. Data analytics can also be tracked and/or maintained for this subsequent post involving the video. As such, the disclosed technology can improve efficiency at least by reducing uploading and storing operations.

Additionally, in some embodiments, the video representation module 202 can utilize the data analytics module 208 to facilitate aggregating based on the first post and the second post, data analytics for the first video representation.

In general, data analytics, metrics, insights, and/or other information, etc., collected via each post in a set of one or more posts associated with a video representation can be aggregated to obtain combined data analytics for a corresponding video. In some cases, the data analytics can be associated with at least one of reach information (e.g., quantity of potential audience members/viewers), view count information, viewer information (e.g., quantity of unique viewers), social engagement information (e.g., quantities of likes, comments, and/or shares), view time information (e.g., duration viewed), or completion information (e.g., average percentage complete). In one example, the view count information can include at least a first view count associated with the first post and a second view count associated with the second post. In this example, aggregating the data analytics for the first video representation can include aggregating the first view count and the second view count. Furthermore, in some cases, the view count information can further include first attribution information for the first view count associated with the first post (e.g., a quantity, amount, and/or proportion of the total view count that is attributable to the first post) and second attribution information for the second view count associated with the second post (e.g., a quantity, amount, and/or proportion of the total view count that is attributable to the second post). Again, there can be many variations associated with the disclosed technology.

In some embodiments, the video detection module 206 can facilitate detecting that a third post is utilizing a second video representation generated based on the video resource on which a first video representation is based. The third post can, for example, be initiated by a second publisher different from the first publisher. The second publisher may be acting legitimately or illegitimately (i.e., without permission from the first publisher) to cause the second video representation to be generated. In some cases, such as when the second publisher is acting illegitimately or when the first and second publishers decide to begin collaborating, the video representation module 202 can cause the third post to utilize the first video representation instead of the second video representation. As a result, the data analytics module 208 can aggregate the data analytics for the first video representation further based on the third post. In some cases, the data analytics module 208 can provide, not only the first publisher, but also the second publisher with access to at least some of the data analytics for the first video representation.

Furthermore, in some embodiments, the video detection module 206 can utilize a copyright checking process to determine whether or not a second publisher is legitimately posting a video or not (e.g., violating a copyright). In one example, the video detection module 206 can detect, such as based on one or more image hashing algorithms, that a video involved in a post from the second publisher is substantially (within an allowable deviation and that at least meets a specified minimum threshold level of confidence) the same as a video posted by the first publisher. The video detection module 206 can also determine that the first publisher has not granted permission for the second publisher to utilize the video. Accordingly, in this example, the video representation module 202 can provide, to the first publisher, a notification indicating that the third post is being initiated or made by the second publisher. Then the first publisher can, for instance, provide a command that causes the third post to utilize the first video representation instead of the second video representation. As a result, view counts generated or attributable to the second publisher's post of the video can still be properly credited toward the first video representation associated with the first publisher. As discussed, there can be many variations.

Figure 3A:
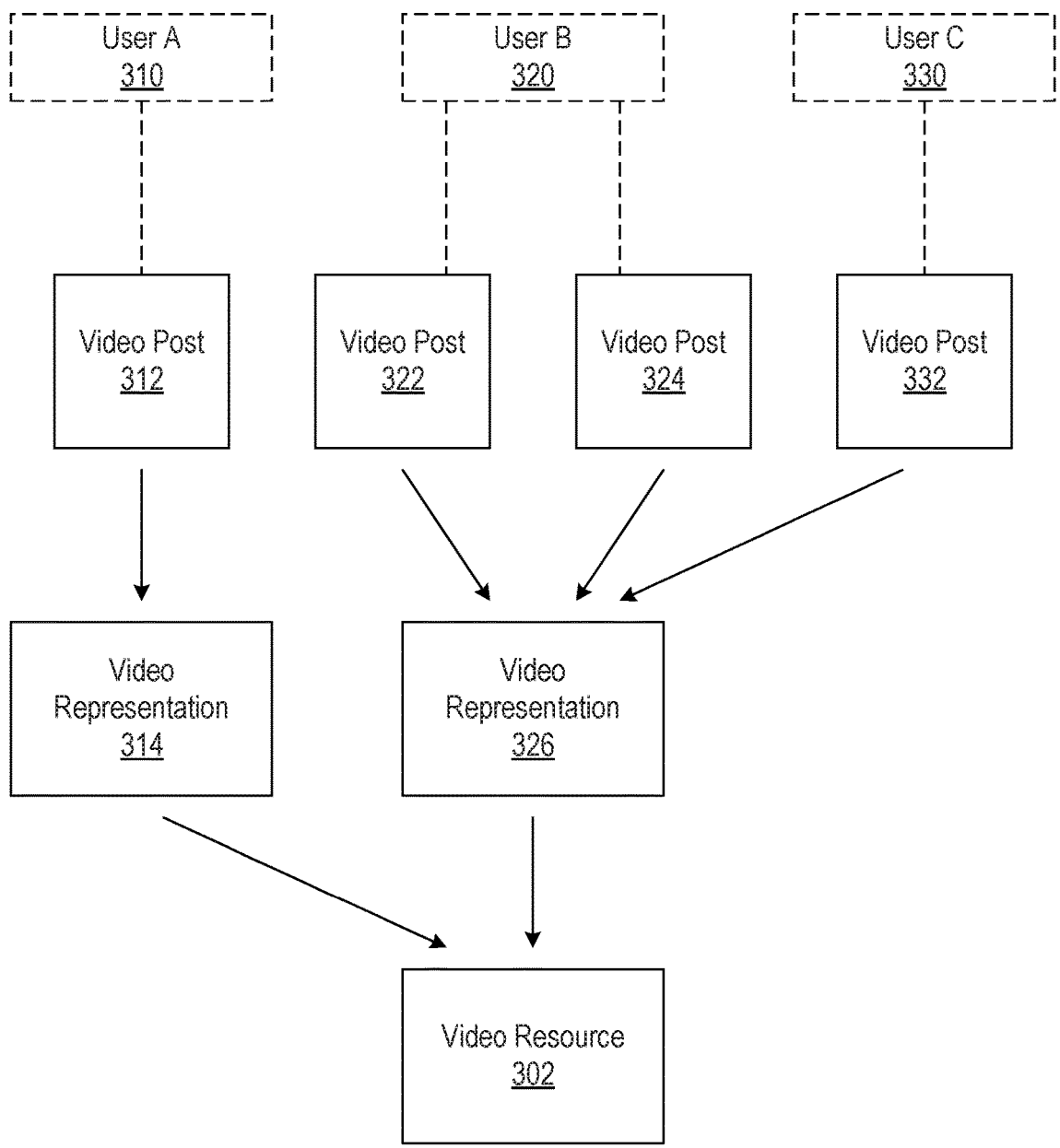
FIG. 3A illustrates an example scenario associated with providing data analytics for videos based on a tiered architecture, according to an embodiment of the present disclosure.

FIG. 3A illustrates an example scenario 300 associated with providing data analytics for videos based on a tiered architecture, according to an embodiment of the present disclosure. As shown in the example scenario 300 of FIG. 3A, there can be a plurality of publishers, such as User A 310, User B 320, and User C 330. In this example scenario 300, User B 320 has uploaded a video, which can be stored by the disclosed technology as a video resource 302 in a first level (e.g., a base level) of the tiered architecture. When User B 320 is initiating or making a first post 322 representable at a third level (e.g., a top level) and involving the video, the disclosed technology can create, at a second level (e.g., a middle level) and based on the video resource 302 at the first level, a video representation 326 for the first post 322. Subsequently, when User B 320 is initiating or making a second post 324 involving the same video, the disclosed technology can cause the second post 324 to utilize the already existing video representation 326.

Additionally, User B 320 and User C 330 can, for instance, have agreed to collaborate such that User C's post 332 at the third level utilizes User B's video representation 326 at the second level. Therefore, in this example scenario 300, data analytics for User B's video representation 326 can be aggregated from the posts of User B 320 and User C 330 (e.g., posts 322, 324, and 332).

Furthermore, in this example, User A 310 can decide to upload the same video for a post 312. The disclosed technology can determine, such as based on image processing techniques, that the video resource 302 for the same video already exists and can thus generate, based on the video resource 302, a video representation 314 for User A's post 312. In some cases, the disclosed technology also can perform a copyright check to determine whether the post 312 of User A 310 is legitimate/permissible or not. In some implementations, if User A 310 does not have permission to make the post 312 involving the same video of User B 320, the disclosed technology can notify User B 320 and can provide User B 320 with an option to redirect User A's post 312 such that User A's post 312 relies on User B's video representation 326. It is contemplated that many variations associated with the disclosed technology are possible.

Figure 3B:
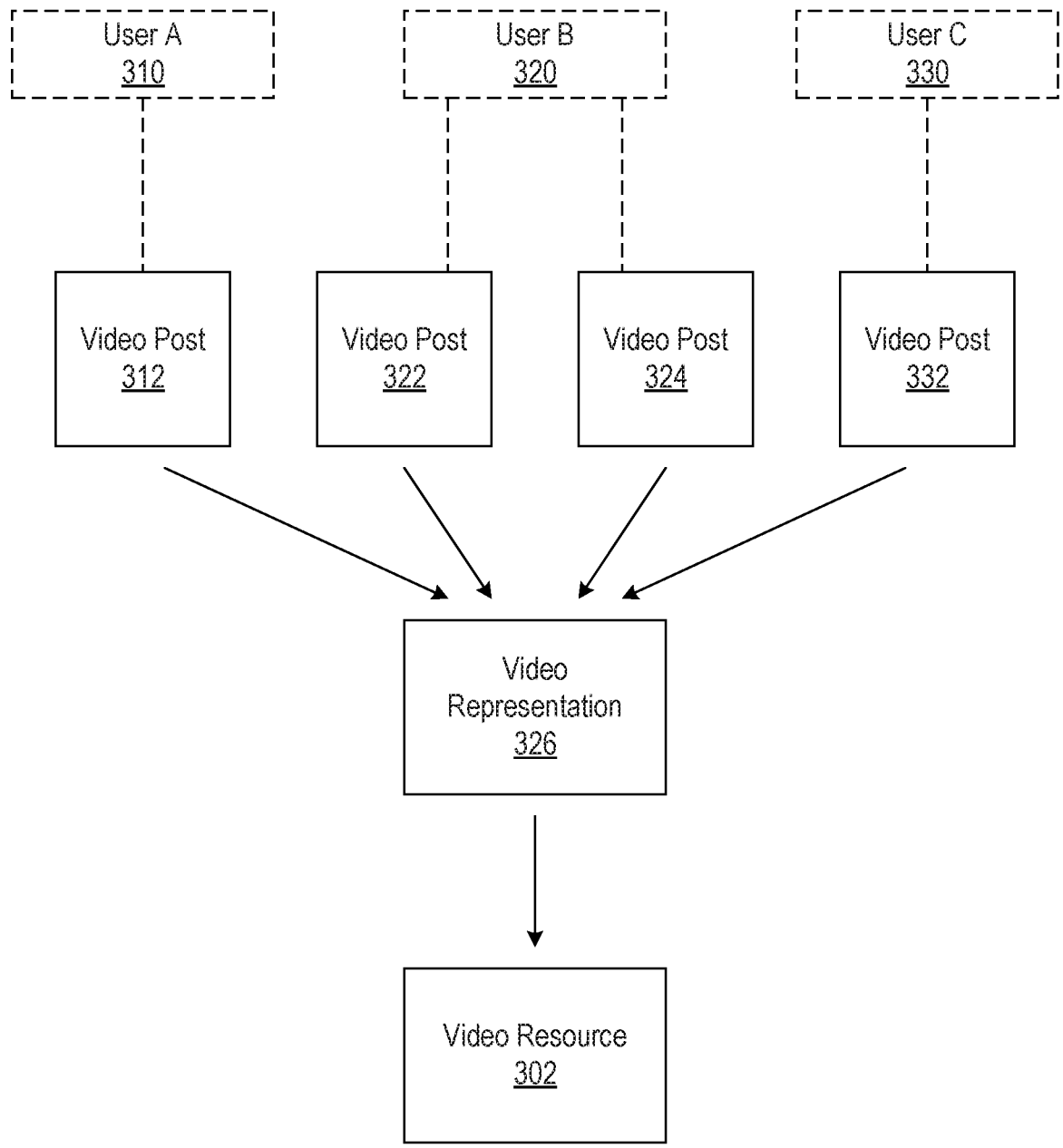
FIG. 3B illustrates an example scenario associated with providing data analytics for videos based on a tiered architecture, according to an embodiment of the present disclosure.

FIG. 3B illustrates an example scenario associated with providing data analytics for videos based on a tiered architecture, according to an embodiment of the present disclosure. The example scenario of FIG. 3B illustrates the example scenario 300 of FIG. 3A subsequent to the post 312 of User A 310 being redirected, such that User A's post 312 utilizes the video representation 326 associated with User B 320. Accordingly, data analytics, insights, and/or metrics from User A's post 312, User B's posts 322 and 324, and User C's post 332 can be aggregated for the video representation 326 associated with User B 320. Furthermore, in some cases, User B 320 can access all data analytics information since the video representation 326 is associated with User B 320, whereas User A 310 can only access data analytics information particular to User A 310, such as data analytics information associated with User A's post 312 (as well as public data analytics information). Again, many variations are possible.

Figure 3C:
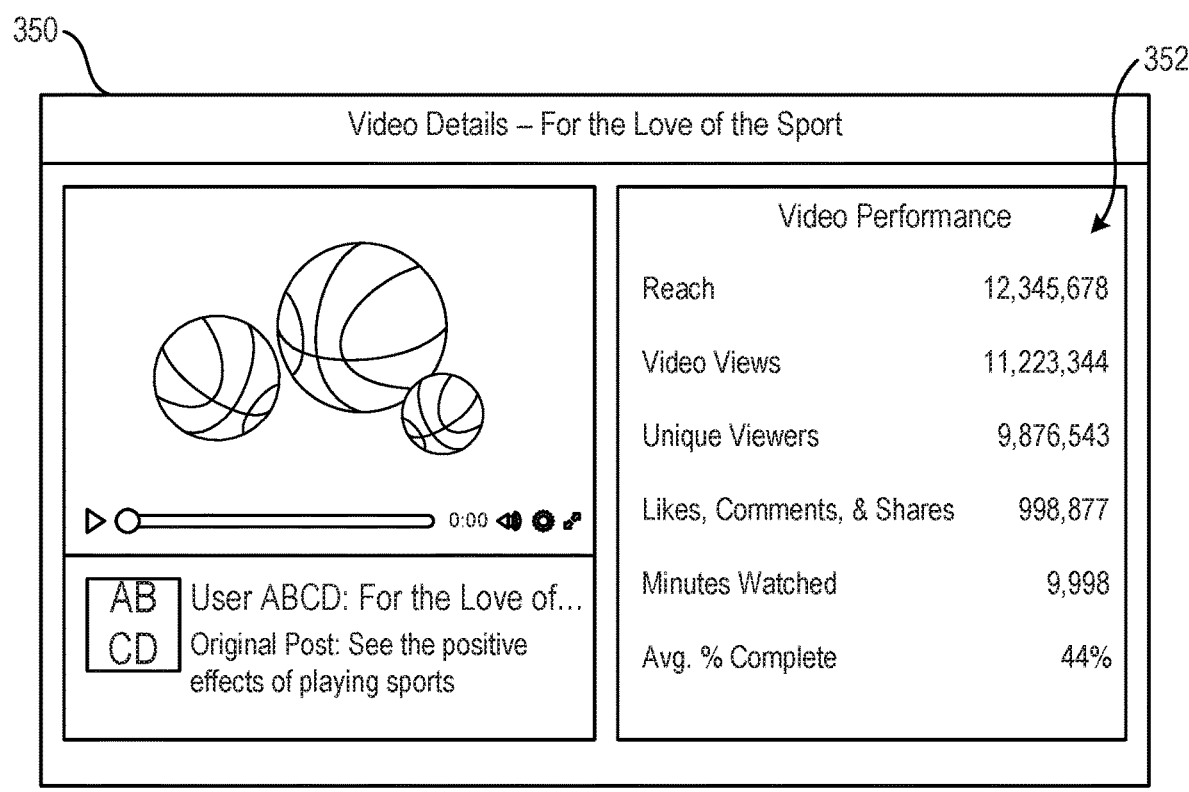
FIG. 3C illustrates an example screenshot associated with providing data analytics for videos based on a tiered architecture, according to an embodiment of the present disclosure.

FIG. 3C illustrates an example interface 350 associated with providing data analytics for videos based on a tiered architecture, according to an embodiment of the present disclosure. The example interface 350 can present various data analytics 352 (e.g., metrics, insights, and/or information, etc.). For instance, as shown, the data analytics 352 can be associated with at least one of reach information (e.g., quantity of potential audience members/viewers), view count information, viewer information (e.g., quantity of unique viewers), social engagement information (e.g., quantities of likes, comments, and/or shares), view time information (e.g., duration viewed), and/or completion information (e.g., average percentage complete), etc. In some embodiments, the data analytics 352 can represent aggregated data analytics for a video representation associated with a plurality of posts by one or more users. As discussed, it should be appreciated that there can be many variations or other possibilities associated with the disclosed technology.

Figure 4:
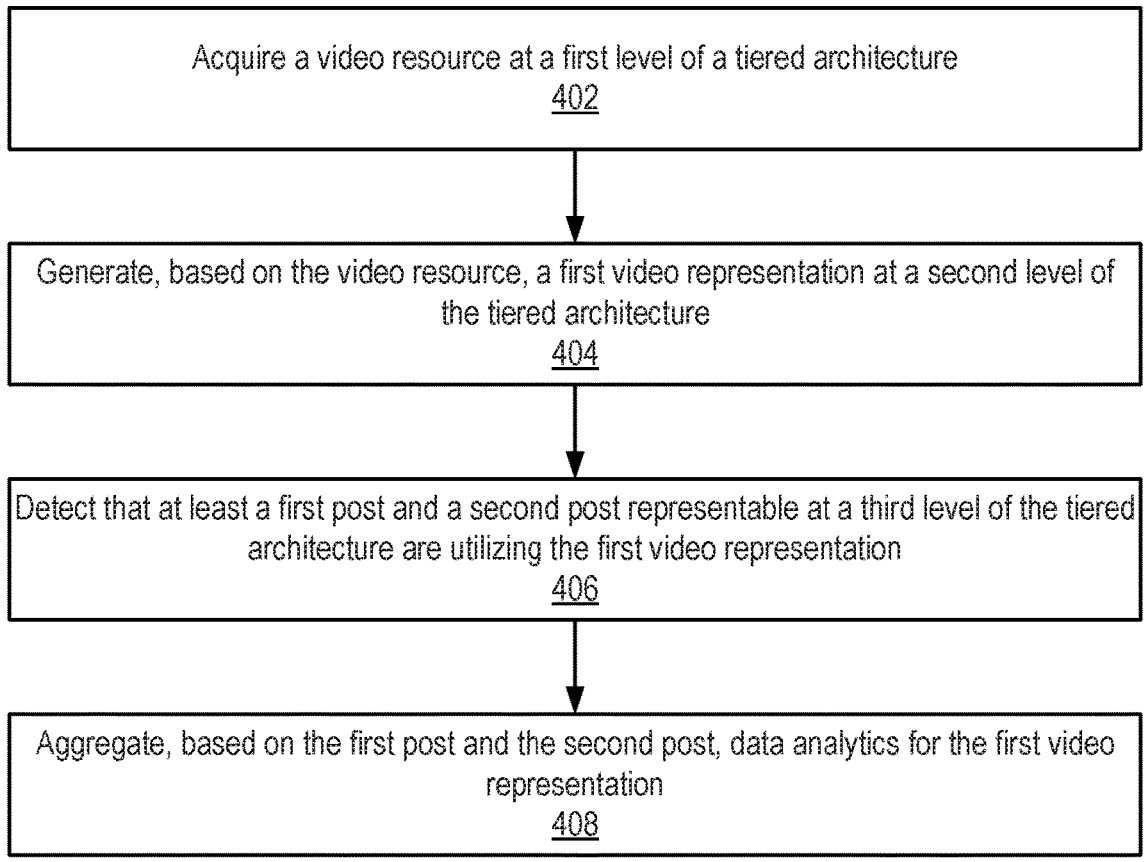
FIG. 4 illustrates an example method associated with providing data analytics for videos based on a tiered architecture, according to an embodiment of the present disclosure.

FIG. 4 illustrates an example method 400 associated with providing data analytics for videos based on a tiered architecture, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can acquire a video resource at a first level of a tiered architecture. At block 404, the example method 400 can generate, based on the video resource, a first video representation at a second level of the tiered architecture. The first video representation can be associated with a first publisher. At block 406, the example method 400 can detect that at least a first post and a second post are utilizing the first video representation. The first post and the second post can be representable at a third level of the tiered architecture and can be initiated by the first publisher. At block 408, the example method 400 can aggregate, based on the first post and the second post, data analytics for the first video representation.

FIG. 5 illustrates an example method 500 associated with providing data analytics for videos based on a tiered architecture, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can detect that a third post is utilizing a second video representation generated based on the video resource. The third post can be initiated by a second publisher. At block 504, the example method 500 can cause the third post to utilize the first video representation instead of the second video representation. At block 506, the example method 500 can aggregate data analytics for the first video representation further based on the third post.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
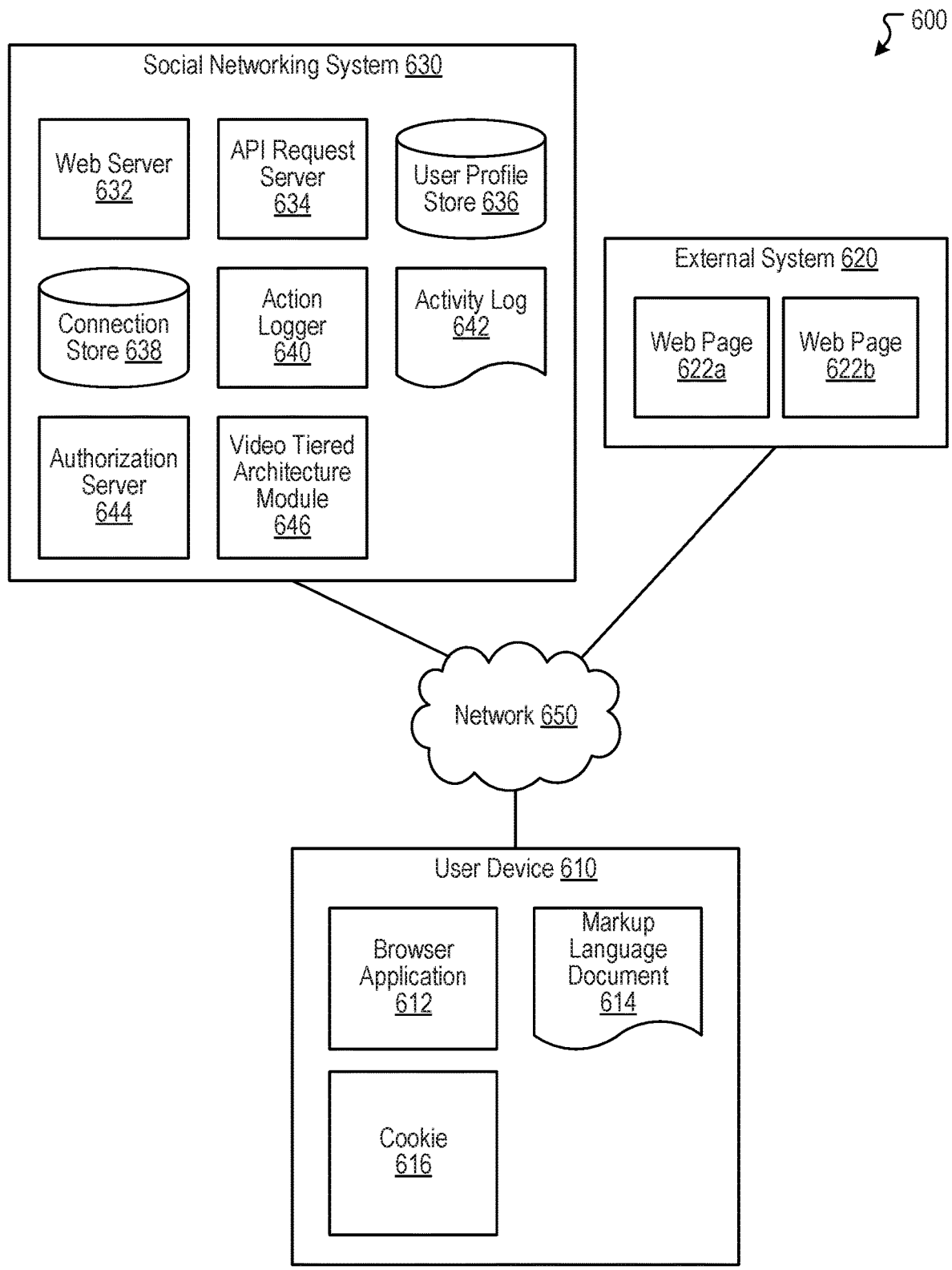
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video tiered architecture module 646. The video tiered architecture module 646 can, for example, be implemented as the video tiered architecture module 102 of FIG. 1. As discussed previously, it should be appreciated that there can be many variations or other possibilities associated with the disclosed technology. For example, in some instances, the video tiered architecture module (or at least a portion thereof) can be included or implemented in the user device 610. Other features of the video tiered architecture module 646 are discussed herein in connection with the video tiered architecture module 102.

Hardware Implementation

Figure 7:
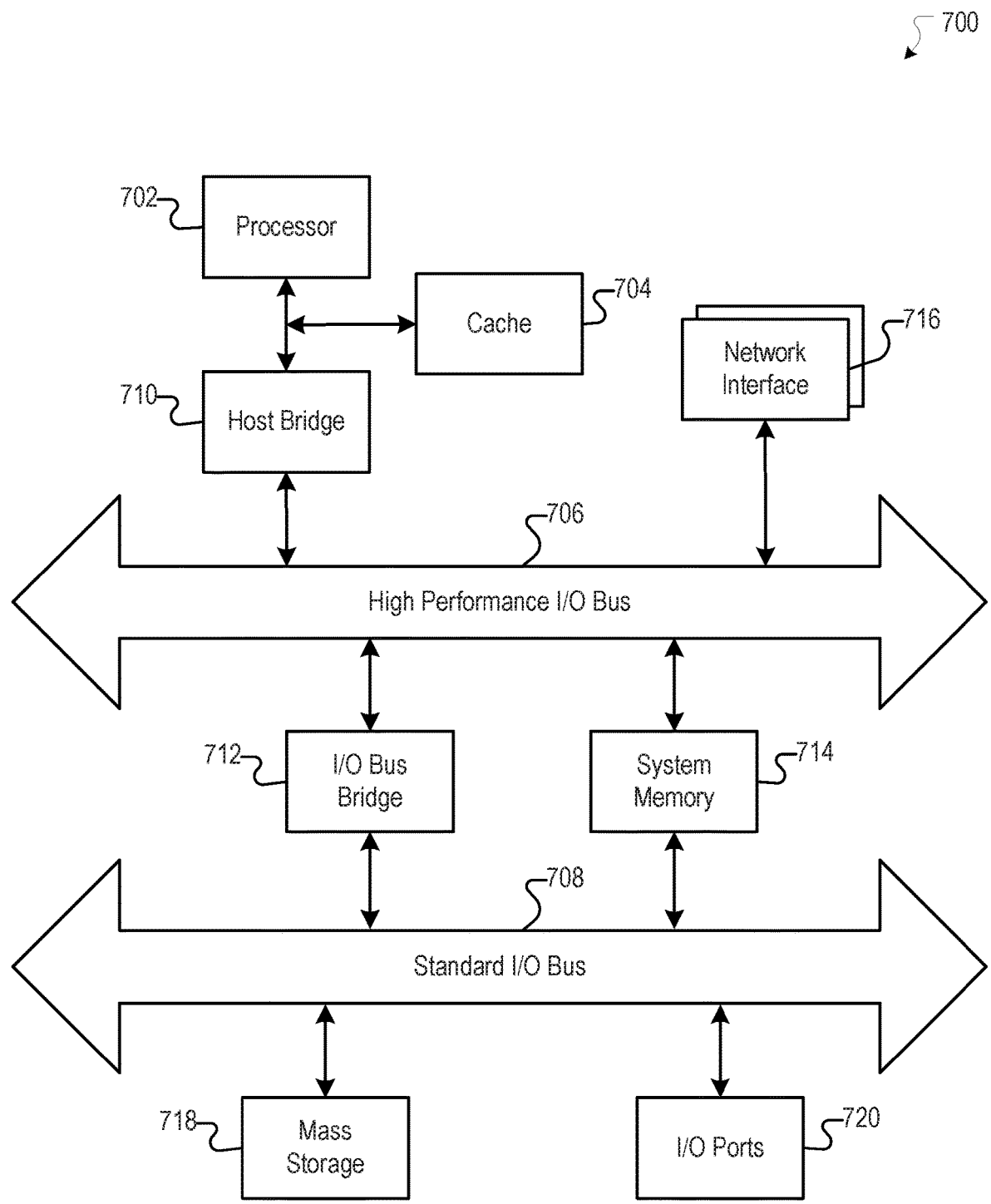
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a video resource at a first level of a tiered architecture, the video resource uploaded by a first publisher to a content platform;
   generating, by the computing system, based on the video resource, a first video representation at a second level of the tiered architecture;
   detecting, by the computing system, that at least a first post and a second post representable at a third level of the tiered architecture are utilizing the first video representation;
   aggregating, by the computing system, based on the first post and the second post, data analytics for the first video representation;
   detecting, by the computing system, that a third post is utilizing a second video representation generated based on the video resource, the third post initiated by a second publisher;
   causing, by the computing system, the third post to utilize the first video representation instead of the second video representation in response to (i) a determination that the third post is impermissible based on a copyright check and (ii) a determination that the first publisher provided a command that causes the third post to utilize the first video representation; and
   providing, by the computing system, information describing data analytics for the first video representation, wherein the information is determined based on at least the first post, the second post, and the third post.

2. The computer-implemented method of claim 1, further comprising:
   aggregating data analytics for the first video representation further based on the third post.

3. The computer-implemented method of claim 2, further comprising:
   providing the second publisher with access to the data analytics for the first video representation.

4. The computer-implemented method of claim 2, further comprising:
   providing, to the first publisher, a notification indicating that the third post was initiated by the second publisher.

5. The computer-implemented method of claim 4, wherein providing the notification is associated with a copyright checking process.

6. The computer-implemented method of claim 1, wherein detecting that the third post is utilizing the second video representation is based on one or more image hashing processes.

7. The computer-implemented method of claim 1, wherein the data analytics are associated with at least one of: social engagement information, reach information, view count information, viewer information, view time information, or completion information.

8. The computer-implemented method of claim 7, wherein the view count information includes at least a first view count associated with the first post and a second view count associated with the second post, and wherein aggregating the data analytics for the first video representation includes aggregating the first view count and the second view count.

9. The computer-implemented method of claim 8, wherein the view count information further includes first attribution information for the first view count associated with the first post and second attribution information for the second view count associated with the second post.

10. The computer-implemented method of claim 1, wherein the first video is associated with at least one of an image classification, an image hash value, a description, a caption, an author, a time, a date, a preview image, an encoding, a clip, a tag, or a label.

11. A system comprising:
    at least one processor; and
    a memory storing instructions that, when executed by the at least one processor, cause the system to perform:
       acquiring a video resource at a first level of a tiered architecture, the video resource uploaded by a first publisher to a content platform;
       generating, based on the video resource, a first video representation at a second level of the tiered architecture;
       detecting that at least a first post and a second post representable at a third level of the tiered architecture are utilizing the first video representation;
       aggregating, based on the first post and the second post, data analytics for the first video representation;
       detecting that a third post is utilizing a second video representation generated based on the video resource, the third post initiated by a second publisher;
       causing the third post to utilize the first video representation instead of the second video representation in response to (i) a determination that the third post is impermissible based on a copyright check and (ii) a determination that the first publisher provided a command that causes the third post to utilize the first video representation, and
       providing information describing data analytics for the first video representation, wherein the information is determined based on at least the first post, the second post, and the third post.

12. The system of claim 11, wherein the instructions cause the system to further perform:
    aggregating data analytics for the first video representation further based on the third post.

13. The system of claim 11, wherein the data analytics are associated with at least one of: social engagement information, reach information, view count information, viewer information, view time information, or completion information.

14. The system of claim 13, wherein the view count information includes at least a first view count associated with the first post and a second view count associated with the second post, and wherein aggregating the data analytics for the first video representation includes aggregating the first view count and the second view count.

15. The system of claim 11, wherein the first video is associated with at least one of an image classification, an image hash value, a description, a caption, an author, a time, a date, a preview image, an encoding, a clip, a tag, or a label.

16. A non-transitory computer-readable storage medium including instructions that, when executed by at least one processor of a computing system, cause the computing system to perform a method comprising:
    acquiring a video resource at a first level of a tiered architecture, the video resource uploaded by a first publisher to a content platform;
    generating, based on the video resource, a first video representation at a second level of the tiered architecture;
    detecting that at least a first post and a second post representable at a third level of the tiered architecture are utilizing the first video representation;

aggregating, based on the first post and the second post, data analytics for the first video representation;

detecting that a third post is utilizing a second video representation generated based on the video resource, the third post initiated by a second publisher;

causing the third post to utilize the first video representation instead of the second video representation in response to (i) a determination that the third post is impermissible based on a copyright check and (ii) a determination that the first publisher provided a command that causes the third post to utilize the first video representation, and providing information describing data analytics for the first video representation, wherein the information is determined based on at least the first post, the second post, and the third post.

17. The non-transitory computer-readable storage medium of claim 16, wherein the instructions cause the computing system to further perform:

aggregating data analytics for the first video representation further based on the third post.

18. The non-transitory computer-readable storage medium of claim 16, wherein the data analytics are associated with at least one of: social engagement information, reach information, view count information, viewer information, view time information, or completion information.

19. The non-transitory computer-readable storage medium of claim 18, wherein the view count information includes at least a first view count associated with the first post and a second view count associated with the second post, and wherein aggregating the data analytics for the first video representation includes aggregating the first view count and the second view count.

20. The non-transitory computer-readable storage medium of claim 16, wherein the first video is associated with at least one of an image classification, an image hash value, a description, a caption, an author, a time, a date, a preview image, an encoding, a clip, a tag, or a label.

* * * * *